Oct. 17, 1961  P. F. ADAIR  3,004,530
INSTRUMENT
Filed Aug. 10, 1959
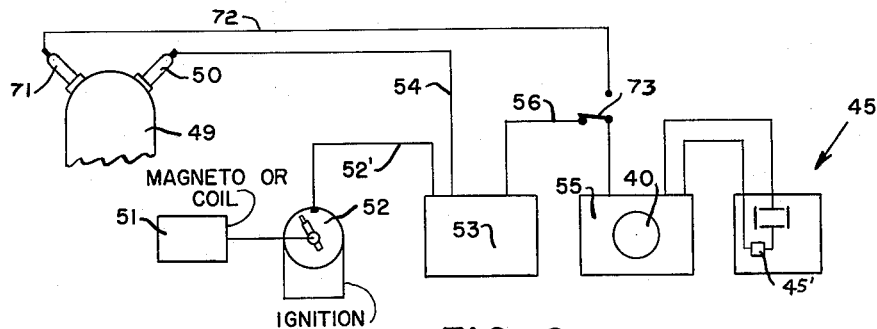
FIG. 2
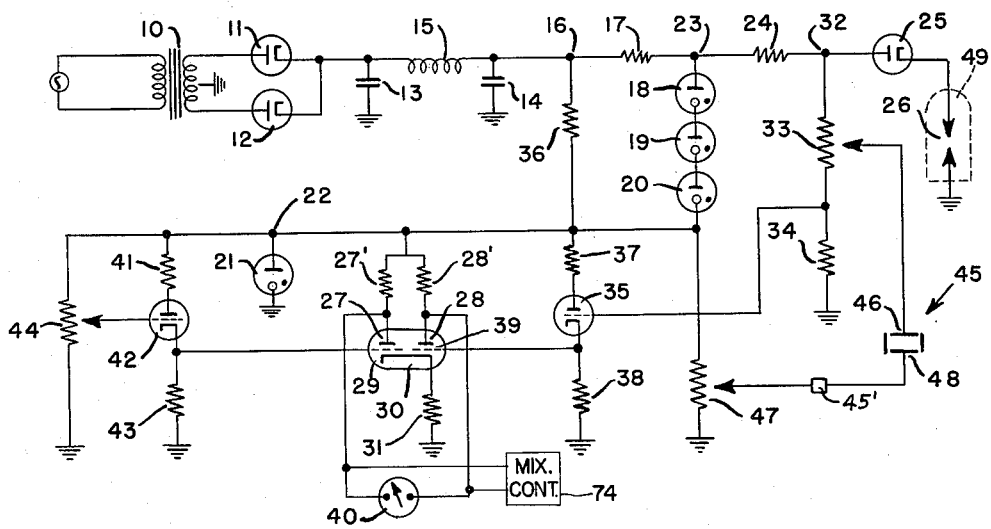
FIG. 1
FIG. 3
INVENTOR.
PAUL F. ADAIR
BY
Pollard Johnston Smyth & Robertson
ATTORNEYS though of this invention  are shown  as applied  to a
United States Patent Office
3,004,530
Patented Oct. 17, 1961

3,004,530
INSTRUMENT
Paul F. Adair, Commack, N.Y., assignor to Jet Ignition Co., Inc., Mineola, N.Y., a corporation of New York
Filed Aug. 10, 1959, Ser. No. 832,840
20 Claims. (Cl. 123—119)

The present invention relates to temperature measuring, indicating and controlling, and particularly to a new and improved method of, and apparatus for measuring, indicating and/or controlling temperatures over wide ranges.

The instantaneous temperatures occurring at a specific location in industrial apparatus are often desired to be known in order to study the functioning of the apparatus. For example, in studying the flame fronts in internal combustion engines of the reciprocating type it is desirable to know the instantaneous temperatures within the combustion chamber independently of heat content and heat radiating from surrounding bodies.

An important object of this invention is to provide a method of, and apparatus for accurately measuring instantaneous values of temperature continuously over preselected ranges.

Another object of this invention is to provide such a method and apparatus capable of measuring and/or controlling temperatures in any temperature range.

Another object of this invention is to provide a system capable of measuring and/or controlling temperatures during the power stroke of internal combustion engines.

Another object of this invention is to provide such a system capable of measuring and/or controlling the temperature of burning gases in jet engines, rockets, ovens, furnaces and other similar devices.

Another object of this invention is to provide a system for measuring and/or controlling the temperatures of stock in rolling mill production.

Another object of the invention is to provide such a system capable of controlling, as a function of temperature, the fuel-air ratio for internal combustion and jet engines.

Another object of the invention is to provide such a system that can employ the spark plug that fires the cylinder of an internal combustion engine as the temperature pick-up for measuring and/or controlling the instantaneous temperatures continuously within the combustion chamber.

In one aspect of the invention, a gap means may be located within any space, the temperature of which is to be instantaneously measured. The gap means may have a predetermined potential impressed across it and may be connected to means which will amplify the variations of current flow across the gap means incident to ionization variations of the gas between the gap due to variations of the temperature of said gas. The gap means may be connected in series with one side of a differential amplifying means, the current flow through the other side of which may be caused to vary inversely to that flowing through the first mentioned side, which latter is incident to the variation of ionization of the gas between the gap means due to temperature variations of said gas.

In still another aspect of the invention, the spark plug of a cylinder of an internal combustion engine, the continuous instantaneous temperatures of the combustion chamber of which are desired to be measured or used to control the fuel-air ratio thereof or the like, may be connected in series with one side of a differential amplifying means as above, in combination with an ignition phasing unit for firing the cylinder of the engine.

In still another aspect of the invention, a gap means may be provided within the cylinder of an internal combustion engine separate from the spark plug therefor in which the gap means may be connected to a direct current differential amplifier as above, in which case the ignition phasing unit may be dispensed with since the firing of the spark plug is separate from the temperature pick-up gap means.

The above, other objects and novel features of the new and improved system will become apparent from the following specification and accompanying drawings which are merely exemplary.

In the drawings:

FIG. 1 is a schematic wiring diagram to which the principles of the invention have been applied;

FIG. 2 is a block diagram of a modified form of the invention; and

FIG. 3 is a schematic wiring diagram of the ignition phasing unit shown in FIG. 2.

Referring to the drawings, and particularly to FIG. 1, the principles of the invention are shown as applied to a wiring diagram for general use, and may comprise a transformer 10, the secondary of which is center tapped to ground. The terminals of the secondary are connected to the plates of separate half-wave rectifier diodes 11 and 12, the cathodes of which are connected together and lead to a π filter including capacitors 13 and 14 on opposite sides of a reactance 15. Accordingly, there will appear at point 16 a filtered direct current voltage.

The point 16 is connected to a resistor 17 and a plurality of gaseous discharge regulator diodes 18, 19, 20 and 21 to ground. Accordingly, there is a stable, filtered direct current voltage at points 22 and 23.

The point 23 is connected through a resistor 24, a diode 25, temperature sensing gap 26 to ground. Merely by way of example, gap 26 may be located within the cylinder of an internal combustion engine, the combustion chamber of a jet engine or a rocket, of a furnace or an oven, or it may straddle a strip of metal leading from a rolling mill. The point 22 is connected to the plate circuits 27 and 28 of a direct current differential amplifier tube 29 having a common cathode 30 in series with a resistor 31 leading to ground.

The point 32 is connected through resistors 33 and 34 to ground, and a conductor connected between these two resistors leads to the grid of a triode 35. A series connection is provided from point 16 through resistors 36 and 37 and to the plate of tube 35. The cathode of tube 35 leads to ground through a resistor 38 and is coupled to the grid 39 for the plate 28 of tube 29. An indicator and/or indicator controller 40 calibrated for temperature measurement or various control elements may be connected across the plate circuits 27 and 28 of tube 29 for a purpose presently to be described.

The electrodes forming the gap 26 may have a configuration and/or be spaced apart such that the voltage at point 32 produces an insignificant threshold ionizing current across the gap 26 when the gas between the gap is at a temperature lower than the low limit of the desired range to be measured. The lower the low limit of the temperature range to be measured is, the higher the direct current voltage at point 32 must be to sustain equilibrium across the gap 26. Under such circumstances, maximum current flows through resistors 33 and 34 to ground. This provides a voltage between resistors 33 and 34 that is impressed on the grid of tube 35 and which causes the current flowing through tube 35 to approach a maximum for the conditions existing. This maximum flow of current through tube 35 impresses a voltage on grid 39 such that the current flowing through the plate circuit 28 to cathode 30 of tube 29 approaches a maximum for the conditions existing.

The point 22 is connected through a resistor 41 to the plate of a triode 42, the cathode of which leads to ground through a resistor 43, and which cathode is coupled to the grid for the plate circuit 27 of tube 29. The grid of tube 42 is connected to a variable resistor 44 that is connected between ground and point 22.

From the foregoing it is evident that by adjusting resistor 44, a voltage can be impressed upon the grid of tube 42 which will provide a voltage on the grid for the plate 27 that can cause a voltage balance to exist between plate 27 and plate 28. Accordingly, the reading on meter 40 will be zero since cathode 30 is common to both of the plates 27 and 28.

With the circuit of FIG. 1 adjusted as above described, increasing the temperature of the gas at the gap 26 within the range desired to be measured causes increased ionization at a lower voltage. It is to be understood that this striking voltage produces an ionizing current flow across gap 26 without a spark appearing thereacross. Such ionizing current is in the order of micro amperes. As the temperature of the gas at gap 26 rises, the voltage required to sustain equilibrium across the gap 26 falls, causing the grid of tube 35 to become more negative, thereby reducing the current flow through tube 35. This consequently makes the grid 39 of plate 28 of tube 29 more negative, thereby decreasing the flow of current through plate 28.

The decreasing current through plate 28 causes a decrease in the voltage across resistor 31, thereby increasing the current flow through plate 27 of tube 29. The voltage difference across resistors 27' and 28' due to the difference in current flow through plates 27 and 28 is registered on meter 40 and is a function of the temperature of the gas at gap 26. Although a meter 40 has been shown, it is evident that the voltage difference across resistors 27' and 28' may be employed to actuate controls to vary the condition causing the change in temperature of the gas at gap 26.

In order to visually indicate the instantaneous temperature of the gas at gap 26, an oscilloscope tube 45 may have one of a pair of deflecting plates 46 connected to the variable resistor 33. A variable resistor 47, which is connected to B+ and ground, may be connected to the remaining plate 48 of said pair of deflecting plates of tube 45 to control the setting of the oscilloscope trace height. Resistor means 45' may be located within the deflecting plate circuits having values equivalent to the temperature range to be measured so that the oscilloscope trace will produce a calibrated visual picture of the instantaneous temperatures being measured.

Referring to FIG. 2, the principles of the invention are shown in block diagram form of a system for continuously indicating the instantaneous temperatures within the combustion chamber 49 of an internal combustion engine cylinder using a spark plug 50 to act, not only to fire the cylinder, but also to act as the temperature pick-up gap for the instantaneous temperature indication within the cylinder 49.

A magneto or coil 51 may be connected in the usual manner to a distributor 52, the output 52' from which is fed to an ignition phasing unit 53. The ignition phasing unit 53 is a switching device which insures that a voltage of constant predetermined polarity is applied to spark plug 50 regardless of the polarity of the voltage provided by magnetic or coil 51. Ignition phasing unit 53 includes also the means for connecting the constant polarity temperature signal from master unit 55 to spark plug 50. The output 54 from unit 53 is fed to the spark plug 50, and it also acts as a conductor for connecting the spark plug to a master unit 55, having a circuit identical to that shown in FIG. 1, through a conductor 56.

Referring to FIG. 3, the voltage from distributor 52 (FIG. 2) is fed through conductor 52' to the plate of a diode 57 and to the cathode of a diode 58. In many internal combustion engines the pulse from the distributor may be plus or minus relative to ground, depending upon the specific wiring arrangement. If the pulse is positive relative to ground, the pulse passes through the tube 57 through conductor 54 to the spark plug 50. If the pulse is negative relative to ground, then it flows from ground through a transformer primary 59, thence across a gap 60, through tube 58 and back to the distributor through line 52'. Current flowing through primary 59 induces a voltage in secondary 61 which supplies a voltage to the primary 63 of a transformer 64. The input to primary 63 is reversed in polarity relatively to the secondary 61. Accordingly, the voltage induced in the secondary 65 of transformer 64 is reversed in polarity relatively to the voltage in primary 59. Consequently, the positive pulse from secondary 65 passes through a diode 66, thence through line 54 to the spark plug 50. The polarity of the temperature signal, being positive with respect to ground (FIG. 3) is connected by conductor 56, diode 25, and conductor 54 to spark plug 50.

As the temperature of the gases at gap 50 rises, ionizing current begins to flow across gap 26, causing the voltage across resistors 33 and 34 (FIG. 1) to decrease, thereby decreasing the current flowing through the resistor 28' and increasing the current flowing through resistor 27' as previously described in connection with FIG. 1. Accordingly, the differential voltage between resistors 27' and 28' appears on the meter 40 (FIG. 2) as instantaneous temperatures within the cylinder 49. It is, of course, understood that this differential voltage may be employed to control the fuel-air ratio in cylinder 49 to maintain the temperature therein within desired limits. Mixture control 74 is shown in FIG. 1.

High voltage filament transformers 67 and 68 furnish heater voltage without creating a short to ground for the ignition voltage, while condensers 69 and 70 pass the induced high-frequency voltage generated in the primary at the time of ignition to eliminate any high-frequency feedback.

Should it be desirable to employ a temperature pick-up gap 71 separate from the spark plug 50, the ignition phasing unit may be shunted by connecting line 52' directly to line 54 and having a line 72 feed the temperature pick-up directly to tube 25 within the master unit 55 through a switch 73.

It is to be understood that internal combustion engine shall embrace not only reciprocating engines but also other types of engines in which combustion takes place within the engine, such as jet engines in which the fuel continuously burns and is ignited by means other than a spark gap, distributor ignition means.

Although the various features of the new and improved temperature measuring system and apparatus have been shown and described in detail to fully disclose several embodiments of the invention, it will be evident that changes may be made in such details and certain features may be used without others without departing from the principles of the invention.

What is claimed is:

1. The method of instantaneously and continuously measuring temperature above a predetermined value which comprises providing a gap at the location where the temperature is to be measured; impressing a voltage across said gap of a value such that a predetermined current flows across said gap at the low end of said range of temperatures to be measured; presetting a differential amplifying means so that its output is zero when the temperature at said gap is such that said predetermined current is flowing across said gap; and measuring the output of said amplifying means as the temperature at said gap varies within the range of temperatures to be measured.

2. The method of instantaneously and continuously measuring temperature above a predetermined value which comprises providing a gap at the location where the temperature is to be measured; impressing a voltage across said gap of a value such that a predetermined current flows across said gap at the low end of said range of temperatures to be measured; presetting a differential amplifying means so that its output is zero when the temperature at said gap is such that said predetermined current is flowing across said gap; and utilizing the output of said amplifying means to control the temperature at said gap.

3. The method of instantaneously and continuously measuring temperature above a predetermined value which comprises providing a gap at the location where the temperature is to be measured; impressing a voltage across said gap of a value such that a predetermined current flows across said gap at the low end of said range of temperatures to be measured; measuring the changes of ionization current flowing across said gap incident to changes in the temperature of the gas at said gap and relating the measured charges of ionization current flowing across said gap to changes in temperature said predetermined value.

4. The method of instantaneously and continuously measuring temperature above a predetermined value which comprises providing a gap at the location where the temperature is to be measured; impressing a voltage across said gap of a value such that a predetermined current flows across said gap at the low end of said range of temperatures to be measured; presetting a datum; and utilizing the changes of ionization current flowing across said gap incident to changes in the temperature of the gas at said gap for controlling the temperature at said gap.

5. In an internal combustion engine having a combustion chamber and means for igniting a gaseous mixture supplied to said chamber, gap means separate from said igniting means within said chamber; and means responsive to ionization current flowing across said gap means for measuring the instantaneous temperatures of the gas at said gap means.

6. In an internal combustion engine having a combustion chamber, a spark gap for igniting a gaseous mixture supplied to said chamber; and means responsive to ionization current flowing across said spark gap for measuring the instantaneous temperatures of the gas at said spark gap.

7. In a system for continuously measuring instantaneous variations of temperature comprising in combination, gap means adapted to be located at the point where said temperatures are to be measured; a direct current power supply in series with resistance means and said gap means; differential amplifying means including separate plate circuits in parallel with said gap means; means responsive to ionization current flowing across said gap means adapted to control the voltage on the grid of one of the plate circuits of said differential amplifying means; and adjustable means adapted to control the voltage on the grid of the other plate circuit of said differential amplifying means.

8. In a system for continuously measuring instantaneous variations of temperature comprising in combination, gap means adapted to be located at the point where said temperatures are to be measured; a direct current power supply in series with resistance means and said gap means; differential amplifying means including separate plate circuits in parallel with said gap means; means responsive to ionization current flowing across said gap means adapted to control the voltage on the grid of one of the plate circuits of said differential amplifying means; adjustable means adapted to control the voltage on the grid of the other plate circuit of said differential amplifying means; and an indicating instrument connected across the two circuits of said amplifying means.

9. In a system for continuously controlling temperature comprising in combination, gap means adapted to be located at the point where said temperature is to be controlled; a direct current power supply in series with resistance means and said gap means; differential amplifying means including separate plate circuits in parallel with said gap means; means responsive to ionization current flowing across said gap means adapted to control the voltage on the grid of one of the plate circuits of said differential amplifying means; adjustable means adapted to control the voltage on the grid of the other plate circuit of said differential amplifying means; and control means connected across the two circuits of said amplifying means.

10. In a system for continuously measuring the instantaneous temperatures within a cylinder of an internal combustion engine having a spark gap and distributor means for firing said cylinder comprising in combination, means for feeding the voltage from said distributor to said spark gap including a diode in series with said spark gap; means for feeding a direct current voltage through a resistor in series with said spark gap; a differential amplifying means in parallel with said spark gap and including two parallel circuits, each having identical resistances; means responsive to a predetermined ionization current flowing across said spark gap, said responsive means being located between one of said parallel circuits and said spark gap for varying the current flowing through said one parallel circuit; adjustable means connected to said other parallel circuit for causing a current to flow therethrough that balances the current flowing through said one parallel circuit incident to said predetermined ionization current flowing across said spark gap; and means responsive to the difference in voltage across the resistances of said parallel circuits for indicating variations in temperature of the gas at said spark gap.

11. In a system for continuously controlling the temperature within a cylinder of an internal combustion engine having a spark gap and a distributor for firing said cylinder comprising in combination, means for feeding the voltage from said distributor to said spark gap including a diode in series with said spark gap; means for feeding a direct current voltage through a resistor in series with said spark gap; a differential amplifying means in parallel with said spark gap and including two parallel circuits, each having identical resistances; means responsive to a predetermined ionization current flowing across said spark gap, said responsive means being located between one of said parallel circuits and said spark gap for varying the current flowing through said one parallel circuit; adjustable means connected to said other parallel circuit for causing a current to flow therethrough that balances the current flowing through said one parallel circuit incident to said predetermined ionization current flowing across said spark gap; and means responsive to the difference in voltage across the resistances of said parallel circuits for adjusting the fuel-air ratio supplied to said cylinder.

12. In a system for continuously measuring the instantaneous temperatures within a cylinder of an internal combustion engine having a spark gap and distributor means for firing said cylinder comprising in combination, means for feeding the voltage from said distributor to said spark gap including a diode in series with said spark gap; means for feeding a direct current voltage through a resistor in series with said spark gap; a differential amplifying means in parallel with said spark gap and including separate plate circuits; means responsive to ionization current flowing across said spark gap adapted to control the voltage on the grid of one of the plate circuits of said differential amplifying means; adjustable means adapted to control the voltage on the grid of the other plate circuit of said amplifying means; and means responsive to the difference in voltage across said plate circuits for measuring the instantaneous temperatures of the gas at said spark gap.

13. In a system for continuously controlling the temperature within a cylinder of an internal combustion engine having a spark gap and a distributor for firing said cylinder comprising in combination, means for feeding the voltage from said distributor to said spark gap including a diode in series with said spark gap; means for feeding a direct current voltage through a resistor in series with said spark gap; a differential amplifying means in parallel with said spark gap and including separate plate circuits; means responsive to ionization current flowing across said spark gap adapted to control the voltage on the grid of one of the plate circuits of said differential amplifying means; adjustable means adapted to control the voltage on the grid of the other plate circuit of said amplifying means; and means responsive to the difference in voltage across said plate circuits for adjusting the fuel-air ratio supplied to said cylinder.

14. In a system for continuously measuring the instantaneous temperatures within a cylinder of an internal combustion engine having a spark gap and distributor means for firing said cylinder comprising in combination, means for feeding the voltage from said distributor to said spark gap including a diode in series with said spark gap, said diode being arranged to conduct if said voltage is at one polarity; means for reversing the polarity of said voltage if it is of the opposite polarity; means for feeding a direct current voltage through a resistor in series with said spark gap; a differential amplifying means in parallel with said spark gap and including two parallel circuits, each having identical resistances; means responsive to a predetermined ionization current flowing across said spark gap, said responsive means being located between one of said parallel circuits and said spark gap for varying the current flowing through said one parallel circuit; adjustable means connected to said other parallel circuit for causing a current to flow therethrough that balances the current flowing through said one parallel circuit incident to said predetermined ionization current flowing across said spark gap; and means responsive to the difference in voltage across the resistances of said parallel circuits for indicating variations in temperature of the gas at said spark gap.

15. In a system for continuously measuring instantaneous variations of temperature comprising in combination, gap means adapted to be located at the point where said temperatures are to be measured; a direct current power supply in series with resistance means and said gap means; differential amplifying means including separate plate circuits in parallel with said gap means; means responsive to ionization current flowing across said gap means adapted to control the voltage on the grid of one of the plate circuits of said differential amplifying means; adjustable means adapted to control the voltage on the grid of the other plate circuit of said differential amplifying means; and a meter connected across the separate plate circuits for indicating temperature variations at the point where said temperature is to be measured.

16. In a system for continuously measuring instantaneous variations of temperature comprising in combination, gap means adapted to be located at the point where said temperatures are to be measured; a direct current power supply in series with resistance means and said gap means; differential amplifying means including separate plate circuits in parallel with said gap means; means responsive to ionization current flowing across said gap means adapted to control the voltage on the grid of one of the plate circuits of said differential amplifying means; adjustable means adapted to control the voltage on the grid of the other plate circuit of said differential amplifying means; a meter connected across the separate plate circuits for indicating temperature variations at the point where said temperature is to be measured; and an oscilloscope connected in parallel with said ionization responsive means for visually indicating the instantaneous temperature pattern of the gas at said gap means.

17. In a system for continuously measuring the instantaneous temperature within a cylinder of an internal combustion engine having a spark gap and distributor means for firing said cylinder comprising in combination, means for feeding the voltage from said distributor to said spark gap; separate gap means located within the combustion chamber of said cylinder; means for impressing a direct current voltage across said separate gap means and across two parallel circuits, each having substantially the same resistance; means responsive to variations of ionization current flowing across said separate gap means, said means being located between one of said parallel circuits and said separate gap means for varying the current flowing through said one parallel circuit; adjustable means connected to said other parallel circuit for causing a current to flow therethrough that balances the current flowing through said one parallel circuit incident to said predetermined ionization current across said separate gap means; and means operated by the difference in voltage appearing across the resistances of said parallel circuits for indicating variations in temperature of the gas at said separate gap means.

18. In a system for continuously controlling the temperature within a cylinder of an internal combustion engine having a spark gap and a distributor for firing said cylinder comprising in combination, means for feeding the voltage from said distributor to said spark gap; separate gap means located within the combustion chamber of said cylinder; means for feeding a direct current voltage through a resistor in series with said separate gap means; a differential amplifying means in parallel with said separate gap means and including two parallel circuits, each having identical resistances; means responsive to a predetermined ionization current flowing across said separate gap means, said responsive means being located between one of said parallel circuits and said separate gap means for varying the current flowing through said one parallel circuit; adjustable means connected to said other parallel circuit for causing a current to flow therethrough that balances the current flowing through said one parallel circuit incident to said predetermined ionization current flowing across said separate gap means; and means responsive to the difference in voltage across the resistances of said parallel circuits for adjusting the fuel-air ratio supplied to said cylinder.

19. In a system for continuously measuring instantaneous variations of temperature comprising in combination, gap means adapted to be located at the point where said temperatures are to be measured; means for impressing direct current voltages across said gap means and across two parallel circuits, each parallel circuit having substantially the same resistance; means responsive to variations of ionization current flowing across said gap means, said responsive means being located between one of said parallel circuits and said gap means for varying the current flowing through said one parallel circuit; adjustable means connected to said other parallel circuit for causing a current to flow therethrough that balances the current flowing through said one parallel circuit incident to a predetermined ionization current flowing across said gap means; and means operated by the difference in voltage appearing across the resistances of said parallel circuits for indicating variations in temperature of the gas at said gap means.

20. In a system for controlling temperature comprising in combination, gap means adapted to be located at the point where said temperature is to be controlled; means for impressing direct current voltages across said gap means and across two parallel circuits, each parallel circuit having substantially the same resistance; means responsive to variations of ionization current flowing across said gap means, said responsive means being located between one of said parallel circuits and said gap means for varying the current flowing through said one parallel circuit; adjustable means connected to said other parallel circuit for causing a current to flow therethrough that balances the current flowing through said one parallel circuit incident to a predetermined ionization current flowing across said gap means; and means operated by the difference in voltage appearing across the resistances of said parallel circuits for controlling the temperature of the gas at said gap means.

(References on following page)

References Cited in the file of this patent

UNITED STATES PATENTS

| | | |
|---|---|---|
| 2,389,797 | MacNiel | Nov. 27, 1945 |
| 2,467,732 | Davis | Apr. 19, 1949 |
| 2,517,976 | Clarke | Aug. 9, 1950 |
| 2,523,017 | Harrison | Sept. 19, 1950 |
| 2,543,141 | Vichnievsky | Feb. 27, 1951 |
| 2,595,524 | Henneman | May 6, 1952 |

OTHER REFERENCES

Temperature, Its Measurement and Control in Science and Industry (American Institute of Physics); published by Rheinhold Publishing Corp. 1941; Library of Congress classification, QC 271 A6; pages 730 to 733.